United States Patent [19]
Nowak

[11] Patent Number: 5,772,155
[45] Date of Patent: Jun. 30, 1998

[54] AIRCRAFT WING FLAPS

[76] Inventor: Dieter K. Nowak, 158 Orchard La., Winchester, Tenn. 37398

[21] Appl. No.: 856,844

[22] Filed: May 15, 1997

Related U.S. Application Data

[60] Provisional application No. 60/019,533 Jun. 1, 1996.
[51] Int. Cl.$^6$ .............................. B64C 9/34; B64C 23/06
[52] U.S. Cl. ......................... 244/199; 244/203; 244/213
[58] Field of Search .................................. 244/199, 203, 244/213, 214, 215, 76 R, 76 A, 76 C

[56] References Cited

U.S. PATENT DOCUMENTS

| | | | |
|---|---|---|---|
| 1,749,021 | 3/1930 | Davis | 244/203 |
| 2,549,760 | 4/1951 | Adams | 244/215 |
| 4,117,995 | 10/1978 | Runge | 244/199 X |
| 4,466,586 | 8/1984 | Burnham | 244/213 X |
| 4,739,957 | 4/1988 | Vess et al. | 244/199 |
| 4,836,473 | 6/1989 | Aulehla et al. | 244/199 X |
| 4,955,958 | 9/1990 | Dellinger et al. | 244/213 |
| 5,209,438 | 5/1993 | Wygnanski | 244/199 X |
| 5,598,990 | 2/1997 | Farokhi et al. | 244/199 |

Primary Examiner—William Grant
Attorney, Agent, or Firm—Alan Ruderman

[57] ABSTRACT

A wing assembly has a wing and at least one slender delta shaped flap with sharp leading edges pointing into the flow direction and deployable above the upper wing surface close to the quarter line of the wing for providing significantly enhanced lift and maneuverability to an aircraft. In normal flight the delta flaps are retracted into the wing such that the upper surface of the delta flaps become part of the upper surface of the wing. If higher lift is required or the wing has stalled, the delta flaps are deployed at an angle of attack into the high energy flow region outside the boundary layer of the upper wing surface, at a position relative to the wing that depends on the angle of attack of the wing. There the flaps generate strong and stable vortices at the sharp leading edges and a high pressure area between the lower surface of the delta flap and the upper wing surface resulting in a down draft and flow acceleration downstream of the flap. The infusion of high energy flow into the flow regions of the wing, where flow separation occurs, delays flow separation to significantly higher angles of attack and increases lift

10 Claims, 12 Drawing Sheets

THE FLOW FIELD OF THE WING ACROSS THE LEADING EDGES

$\alpha$ - ANGLE OF ATTACK OF THE WING $c$ - PROFILE CHORD $\alpha_{DF}$ - DELTA FLAP ANGLE AGAINST THE PROFILE CHORD DIRECTION $x_{DF} = \dfrac{x}{c}$ - DIMENSIONLESS DISTANCE OF THE FLAP TO THE TRAILING EDGE OF THE WING $h_{DF} = \dfrac{h}{c}$ - DIMENSIONLESS DISTANCE OF THE FLAP TO THE SURFACE OF THE WING $\alpha_{min}$ - MINIMUM ANGLE OF ATTACK OF THE WING AT WICH THE DELTA FLAP IS DEPLOYED FOR LIFT ENHANCEMENT $\alpha_{max}$ - MAXIMUM PERMISSABLE ANGLE OF ATTACK OF THE WING WITH DELTA FLAPS DEPLOYED

AIRCRAFT WING FLAPS

REFERENCE TO RELATED APPLICATIONS

This application claims the benefit of U.S. Provisional application No. 60/019,533, filed Jun. 1, 1996.

BACKGROUND OF THE INVENTION

1. Field of the Invention

The invention relates to wings for use with aircraft having flaps to improve the lift and performance of the aircraft and more particularly, to wings having one or more slender delta flaps with sharp leading edges deployable at an angle of attack above the upper surface and along the forward portion of the wing whenever an increase in lift of the aircraft is required.

2. Discussion of Prior Art

It is well known that the delta wings with sharp leading edges collect free stream energy of the surrounding flow field and concentrate it in two vortices above the suction side of the delta wing. These vortices create a strong, organized down draft and add significantly to the lift of the delta wing by delaying flow separation from the wing surface to higher angles of attack. Such wings are therefore in use on fighter aircraft.

Trailing or leading edge flap systems or slats in use with present aircraft are deployably attached to the leading or trailing edge of the aircraft wing and are hidden when the aircraft is in normal flight and deployed at take-off or landing. The flaps or slats may cover a considerable portion of the aircraft span and are in effect two dimensional flow devices as they create flow conditions that vary little in spanwise direction and effect a part of the wing span of about the same length as the span of the flap. The lift enhancement comes about through an increase in effective wing area, when the flaps are deployed and through an increase in effective camber of the airfoil, since the flaps are deflected toward the pressure side of the airfoil and thus increase the effective camber of the airfoil. Slots in the flaps are often used to accelerate the flow over the wing surface and to reduce the boundary layer thickness.

Because of the large dimension of the flaps relative to the wing and the correspondingly heavy mechanism for deployment, present art flap systems are heavy. Each wing design requires its own flap design that is an integral part of the wing profile. Moreover, trailing edge flaps are very sensitive to the angle of attack of the aircraft because they are deployed at the most downstream area of the wing where flow separation is most likely to occur. They do not work at all if the wing is in a stalled condition.

Vortex generators, like the delta wing, have been used for quite some time to control the boundary layer of aircraft wings to reduce drag and increase lift. A delta wing having a delta flap rotatably attached to the leading edge of the wing to enhance lift is discussed in U.S. Pat. No. 5,062,595. The flap is rapidly rotated under flow conditions from a position where it is substantially against and parallel to the wing top surface to a position where it is away from and substantially normal to the surface. This is said to create large and stable vortices with high circulation over the wing that enhance lift.

Unlike a flap, prior art vortex generators are small relative to the aircraft wing and are generally in a fixed position to reduce drag at all times during the flight. U.S. Pat. No. 4,836,473 shows vortex generators that are rigidly attached to the wings, the elevator and fin/rudder assemblies and the body near the tail end. In the case of the wing they are attached to the upper wing surface along the entire wingspan downstream of the quarter line of the wing. The vortex generators are said to have an effective height above the wing surface corresponding, at the most, to the displacement thickness of the boundary layer. U.S. Pat. No. 4,655,419 shows a similar fixed position vortex generator that is attached to the forward portion of the wing to generate a vortex which travels downstream over the wing and promotes attached flow. Various shapes of the vortex generator elements are shown in these patents, including delta shapes, that have in common the feature that they are small and permanently deployed along the wingspan or at the aft portion of the fuselage at a fixed angle of attack and are designed to effect the boundary layer of the aircraft wing.

U.S. Pat. No. 4,615,497 includes sensor activated spoilers or vortex generators to control wing flutter. Conventional vortex generators and spoilers are shown that are deployable during wing flutter in response to a suitable sensor, such as a speed sensor or a vibration sensor. U.S. Pat. No. 5,282,591 shows an on-demand wing vortex control system that includes a pair of retractable panels which extend forward through slots in the leading edge of the strake and main wing at their junction. The panels control the strength and location of the leading edge vortex of a swept back wing and thereby the wing lift. U.S. Pat. No. 4,776,542 concerns a highly swept wing tip that provides a vortex based lift that enhances roll damping and serves to prevent stall/spin entry. U.S. Pat. No. 5,253,828 describes a concealable flap-actuated vortex generator for the generation of a vortex over a flap. The vortex generator is activated during flap deployment to enhance flap lift.

Delta shaped flaps that are deployed like a deployable stagger wing above the upper wing surface to maximize the ability of a delta shaped flap to scoop up high flow energy from the free stream around an aircraft wing and direct it into potential flow separation areas through a combination of the vortex system of the delta flap and compression of air between the delta flap and the wing and the deflection of high energy flow is not known in the prior art.

SUMMARY OF THE INVENTION

Accordingly, it is a primary object of the present invention to provide aircraft wing flaps in the form of a delta with sharp leading edges extending rearwardly from the apex, the flaps during normal flight being retracted to form a continuation of the upper surface of the wing and deployable when higher lift is required at subsonic speeds or when the wing has stalled.

The present invention utilizes deflective properties of a surface and the vortex generating capacity of a delta wing with sharp leading edges to concentrate large amounts of kinetic energy of the free stream into two vortices which carry their energy downstream where it is released into the environment. This permits the highly concentrated and organized kinetic flow energy created by the vortex system to be infused into regions where flow separation may occur and also to provide high lift capabilities to the wing. Thus, if used as a wing flap such kinetic energy may be infused into the critical regions of the aircraft wing to keep the flow over the wing organized and attached to the wing surfaces at higher angles of attack than would otherwise be possible. By deploying one or more delta flaps or winglets at specific locations above the aircraft wing high lift may be obtained and/or flow separation over the wing may be corrected when required.

To these ends the present invention positions at least one flap in the form of a slender delta with sharp leading edges above the wing at approximately the quarter line of the aircraft wing with the apex of the delta in the flow direction and the trailing edge substantially parallel to the upper surface of the wing, the flap being at an angle inclined relative to the wing when in operative position. The delta flap is normally in a deactivated position with the upper surface of the flap substantially forming a continuation of the upper surface of the wing. The exact position of the delta flap relative to the wing when deployed into its active position and the angle of attack of the delta flap vary with the angle of attack of the aircraft wing.

Because the delta flap is a three dimensional flow device and effects a much larger part of the wing span than the span of the delta flap, substantially less weight is required for the delta flap system of the present invention than the large flaps and heavy mechanism for deployment in the prior art flap construction. Additionally, the delta flap of the present invention is relatively easy to integrate into the design of a wing, is highly adaptable to different wing designs and configurations, may be deployed when the aircraft already is in a stalled mode, and performs at much larger angles of attack of the aircraft than prior art flaps.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
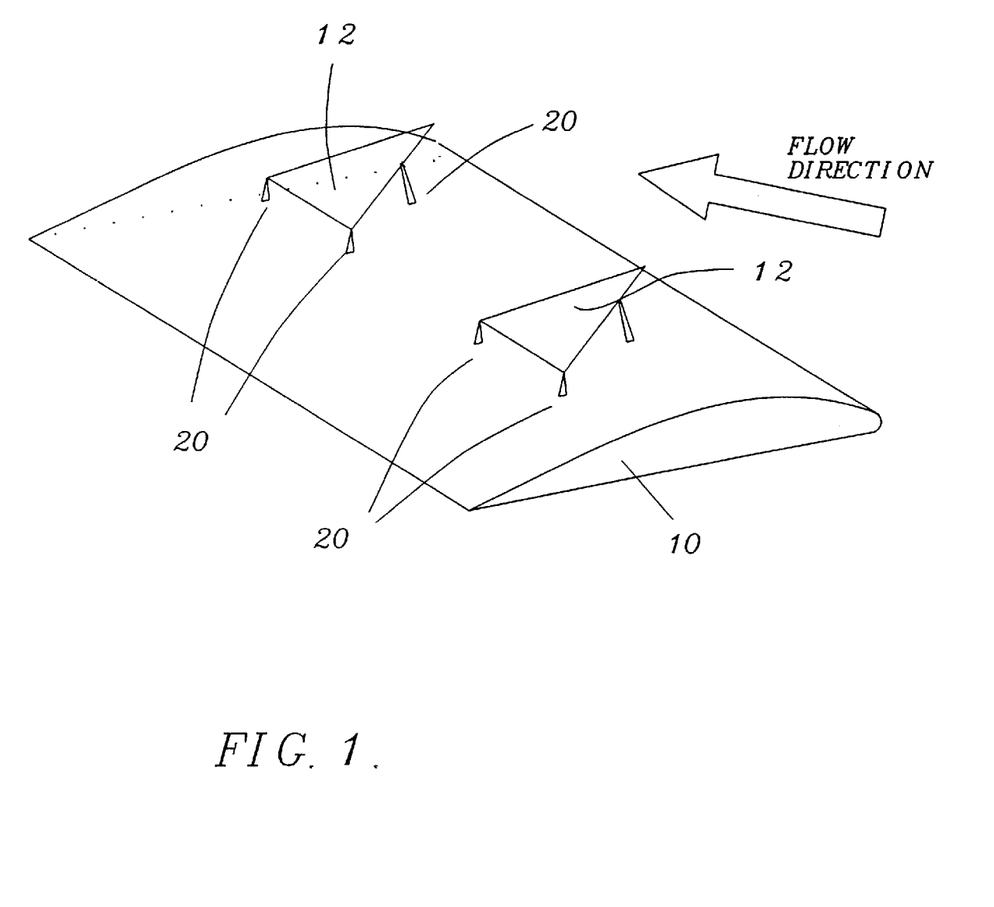
FIG. 1 is a diagrammatic perspective view of a profile of a wing or lifting surface assembly including two delta flaps deployed on the upper surface of a section of the wing.

The present invention is illustrated in the preferred embodiment in FIG. 1 which depicts a portion of an aircraft wing 10 having one or more delta flaps, two such flaps 12 being illustrated in the operative or deployed position above the wing along the wing span. Deployment of the flaps is effected whenever higher lift is required or flow separation over the aircraft wing needs to be corrected. The delta flaps have a maximum chord of approximately ⅓ of the aircraft wing chord and an aspect ratio of about 2. The profile of the delta may be a thin lens shape having a substantially convex, but thin, cross sectional configuration tapered sharply toward the tips with sharp leading edges. The delta flaps are retracted by telescopic supports or levers 20 when not in use thus having no effect during normal flight. On demand the delta flaps are deployed at a position that is a function of the angle of attack of the wing and the aerodynamic state of the airplane.

If several delta flaps are installed on the aircraft wing, as seen in FIG. 1, they can be deployed simultaneously or selectively. Independent deployment on each half wing of the aircraft allows the induction of rolling moments. During normal flight the delta flaps are retracted into the upper wing surface downstream of the quarter line, such that they are part of the upper wing surface. During deployment the lever mechanism lifts the delta flap above the aircraft wing surface while simultaneously moving it toward the leading edge and setting the angle of incidence. At moderate angles of attack during take off, for example, the incidence angle of the delta flap is low and its position relative to the wing geometry is more toward the trailing edge. At high angles of incidence of the aircraft at which flow separation in the trailing edge region occurs, the incidence angle of the delta flap is high and its position relative to the main wing is more toward the leading edge where it tabs the flow energy of the still attached (organized) flow field and directs it into the flow separation region.

Figure 5:
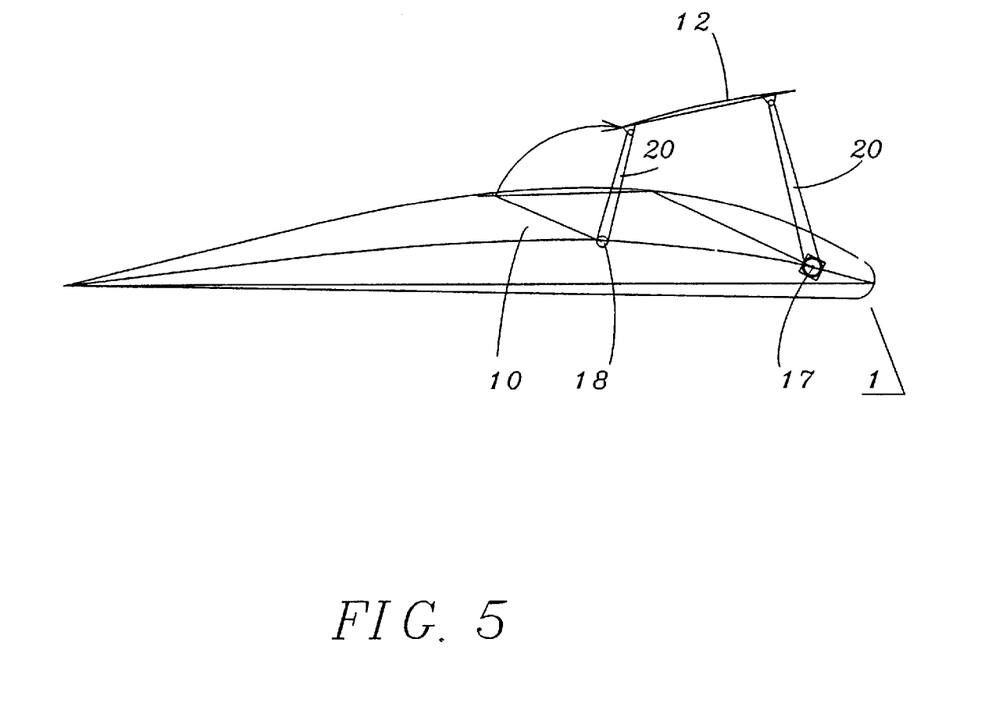
FIG. 5 is a cross sectional view through a wing assembly having a delta flap and illustrating deployment mechanism constructed in accordance with the present invention.
Figure 6:
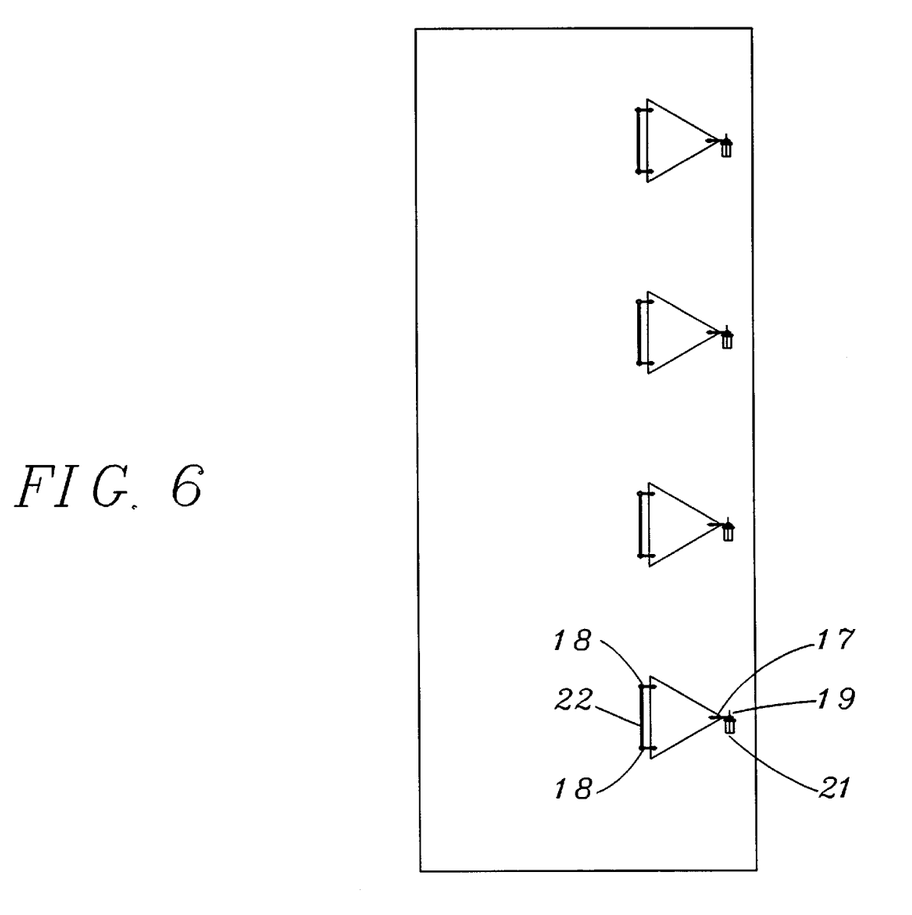
FIG. 6 is a plan view in schematic form illustrating one embodiment driving the mechanism illustrated in FIG. 5.
Figure 7:
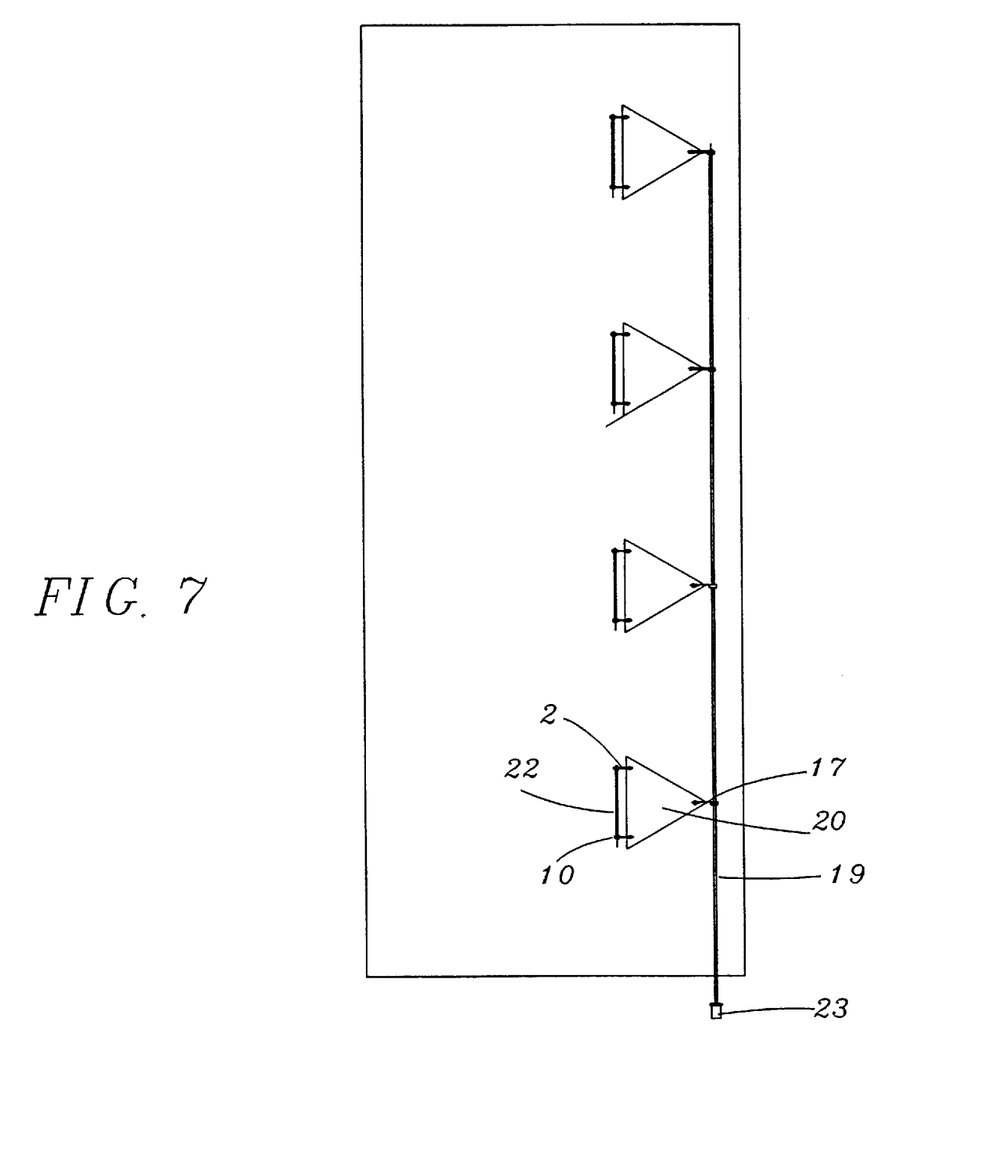
FIG. 7 is a view similar to FIG. 6 illustrating another embodiment of driving the mechanism of FIG. 5.
Figure 8:
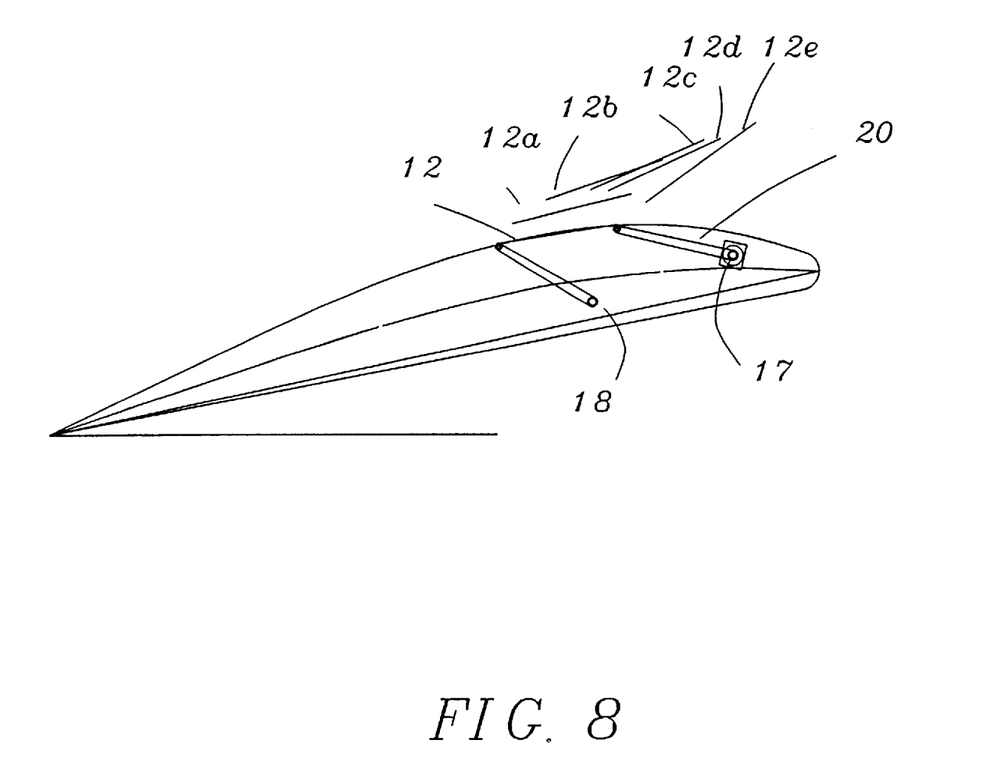
FIG. 8 is a cross sectional view similar to FIG. 5 illustrating the sequence of positions during deployment of the delta flap.

Referring to Fig. 1, each delta flap rests on three struts, which may be rods connected to individual motors either electric or hydraulic, or may be levers 20 driven by one or more motors, each lever being close to or at the tips of the delta and one at the apex of the delta. Referring now to FIG. 5, in a preferred embodiment these levers 20 form a quadric-linkage with the flap. The levers are journally mounted about journals 17, 18 within the aircraft wing thereby lifting the delta flap forward toward the leading edge of the wing and above the aircraft wing surface to a specific position and angle that depends on the angle of attack of the wing and on the status of the flow around the wing. The journal 17 may be a rod or shaft 19 rotatably driven by a motor 21 in the wing as illustrated in FIG. 6 while the journals 18 of each flap may be connected to a common rod 22 pivoted within the wing. Moreover, the rod 19 may extend span-wise within the wing and be driven by a common motor 23 as illustrated in FIG. 7. The position of the points of rotation 17 of the levers are such that in the retracted state the upper surface of the delta flap 12 blends in with the upper surface of the wing; in fully extended state the delta flap has reached its maximum forward position and appropriate angle of attack for maximum angle of attack of the wing. Referring to FIG. 8, during deployment the delta flap moves through positions 12 through 12e progressively toward the leading edge while the trailing edge of the delta flap remains parallel to the wing span of the aircraft wing.

It is an essential characteristic of the invention that the location of the deployment of the delta flaps with respect to the trailing or leading edge of the aircraft wing must be such that it reaches outside the boundary layer and flow separation area into the healthy free flow surrounding the aircraft wing. Therefore, the delta flap must be positioned at a height of ¼ or more of the delta span above the upper aircraft wing surface (suction side) at an incidence angle of up to 28 degrees to the aircraft wing chord. However, the maximum permissible angle for the delta flap is not likely to be the optimum angle. The optimum angle is primarily a function of the angle of attack of the wing, the position of the delta flap with respect to the leading edge and the height of the trailing edge of the delta above the aircraft wing surface.

Figure 9:
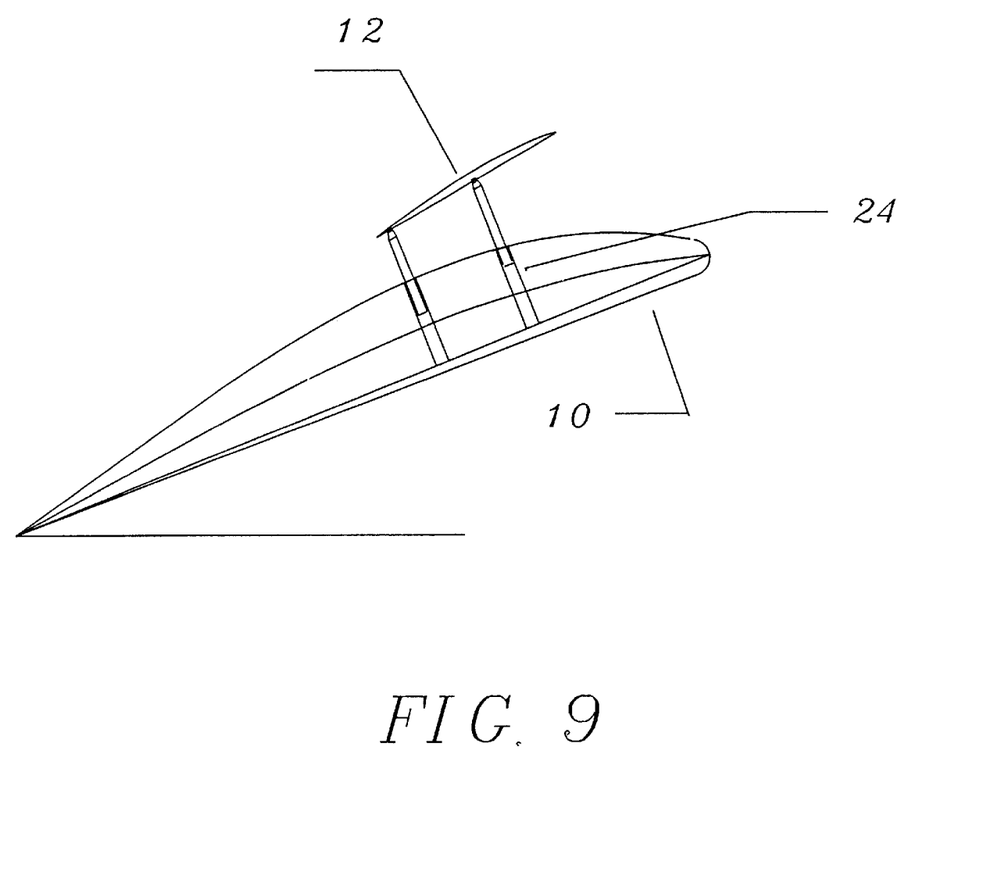
FIG. 9 is a view similar to FIG. 5, but illustrating an alternative embodiment.

Referring to FIG. 9, if the delta flap is used for spin and stall recovery only, it is permissible to move the flap straight into its maximum forward position and optimum angle of attack. In this case an alternative deployment mechanism is the use of three telescopic supports 24 instead of levers that push the delta flap straight up at maximum forward position and optimum angle of attack.

The flow field of the delta flap is highly three dimensional. It influences a flow region of the aircraft wing that is a multiple of the size of the delta planform. This makes the delta flap very efficient relative to its size and weight and sets it apart from conventional flaps.

In fact, the presence of the deployed delta flap reorganizes the flow around the aircraft wing and is already felt at the leading edge of the aircraft wing. Its influence widens toward the trailing edge.

The kinetic energy is collected by the delta flap from the flow outside the boundary layer of the aircraft wing (free stream flow) using the special properties of a thin delta wing with sharp leading edges. The flap can be as thin as the materials permit yet still have sufficient rigidity in strength. Energizing critical flow regions of the aircraft wing keeps the flow over the aircraft wing organized and attached to the wing surface for much higher angles of attack of the aircraft than would otherwise be possible. In addition, deployment of the delta flaps changes the pressure distribution over the suction side of the aircraft wing such, that the net effect is a higher lift even at moderate angles of attack of the aircraft where no flow separation occurs. This is explained in more detail below.

Figure 2:
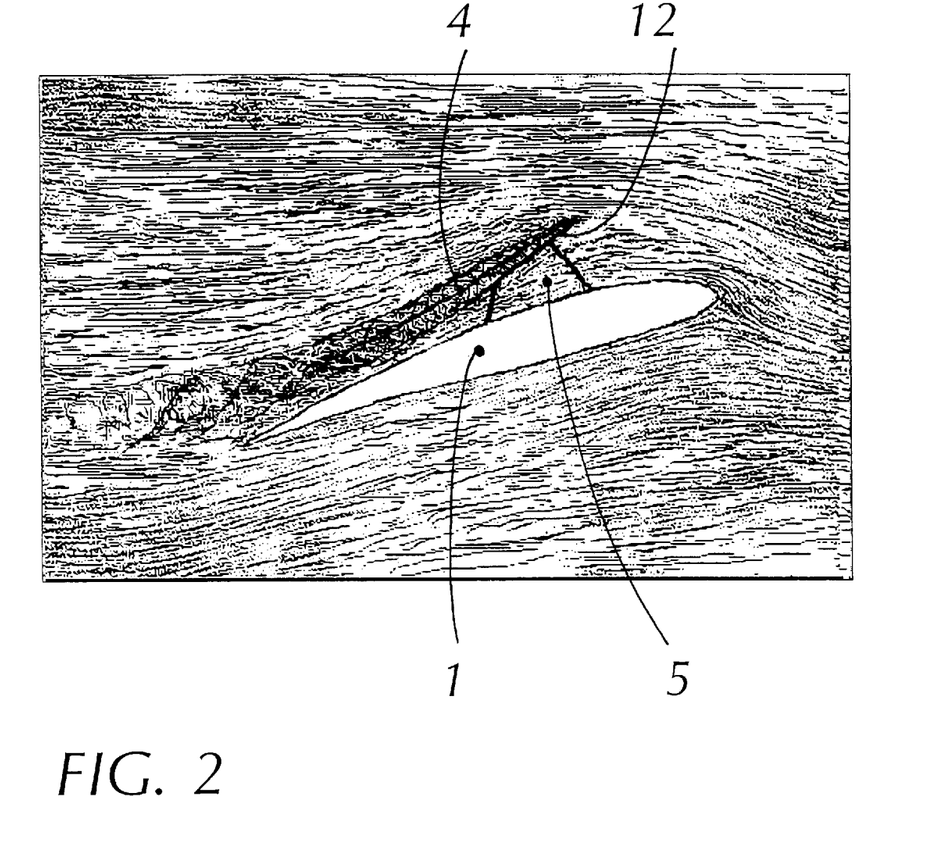
FIG. 2 is an enhanced photographic illustration of the effect of a delta flap on the flow around a wing profile.
Figure 3:
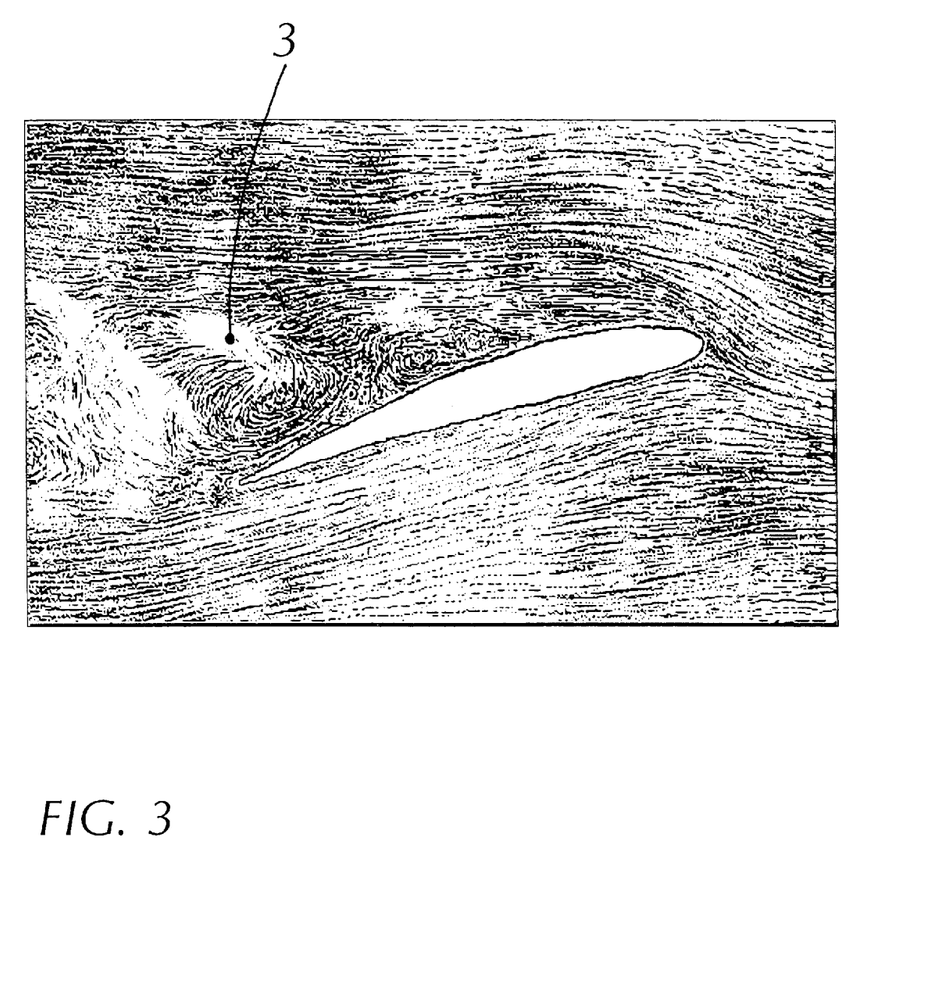
FIG. 3 is a view similar to FIG. 2 but with the flap retracted into the wing and with the wing at the same angle of attack as the wing illustrated in FIG. 2.

Energizing and control of the flow over the aircraft wing is facilitated by the well known leading edge vortex system of a delta planform, such as the delta flap, which collects free stream energy of the surrounding healthy flow field, i.e., attached flow, and concentrates it in two vortices above the suction side of the delta flap and direct them toward the surface of the aircraft wing. These vortices create a strong, organized down draft downstream of the delta flap onto the surface of the aircraft wing where flow separation may occur. If the delta flap is appropriately positioned and dimensioned its flow field is able to overpower the flow separation over the aircraft wing surface in the region downstream of the delta flap. Consequently, the flow is reattached to the wing surface as indicated in FIG. 2. The figure illustrates the effect of the delta flap 12 on the flow around the wing by simulating streamlines in a cross section of the wing profile 1. FIG. 3 illustrates the case of the delta flap retracted and therefore not visible. The flow is separated in the flow region 3. FIG. 2 illustrates the case of the delta flap 12 deployed at the same angle of attack of the wing as shown in FIG. 3. The leading edge vortex 4 of the delta flap energizes the flow region 3 in FIG. 3 and the flow is attached to the wing surface.

The tendency of the vortex system to eliminate flow separation on the aircraft wing is enhanced by the surface effect of the delta flap due to its close proximity to the aircraft wing surface. During delta flap deployment a high pressure area 5 in FIG. 2 is created between the delta flap and the upper aircraft wing surface which accelerates the flow downstream of the delta flap and also strengthens its leading edge vortices because it increases the pressure differential between pressure side and suction side of the delta flap and thus forces the flow faster around the sharp leading edge of the delta flap. By the air being channeled between the flap and the wing, the air is compressed between the lower surface of the flap and the upper surface of the wing. Thus, the space between the flap and the wing acts like a scoop. This produces an effect that is similar to a "ground effect."

Figure 4:
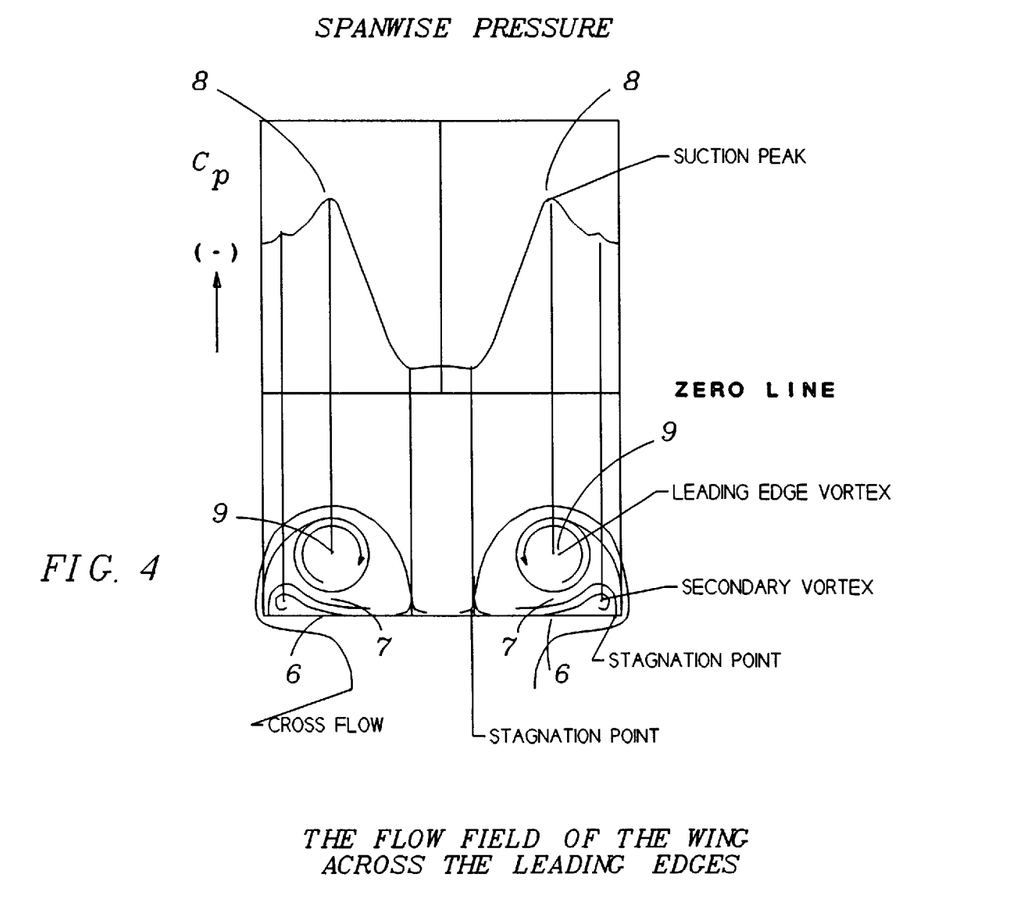
FIG. 4 is a schematic presentation of the cross section of a delta flap taken across the leading edges in span wise direction relative to a wing, and illustrating the surrounding flow field and the corresponding pressure distribution on the suction side of the flap as represented by the pressure coefficient.

The effect of the delta flap on the aircraft wing is defined by the pressure distribution over the suction side of the delta flap and the wing which, in turn, is defined by the leading edge vortex system 9 as illustrated in FIG. 4. The figure indicates the pressure distribution through a cross section 6 in spanwise direction and over the suction side of the delta flap. It is characterized by two very low pressure areas 7. They are indicated by two peaks 8 of the negative pressure coefficient.

The character of this pressure distribution is essentially maintained downstream of the delta flap, over the aircraft wing, although the negative peaks of the pressure coefficient are considerably reduced and their location and the location of the vortex are much farther apart. This character of the pressure distribution results in non-linear lift increase of the aircraft wing with the angle of attack of the aircraft.

The stall mode of the delta flap is initiated by vortex bursting which is an explosion of the vortex core at some downstream position where the back pressure is too large for the vortex to overcome. This position moves upstream as the angle of attack of the wing increases. The general integrity of the vortex system, however, is maintained at first in form of a slower rotating vortex with large diameter and no well defined core. At higher angle of attack of the aircraft wing it is eventually corrupted by the irregular flow of fully developed flow separation and disintegrates with further increasing angle of attack. The result is a flat maximum of the lift coefficient vs. incidence function of the aircraft wing. Therefore the delta wing planform has very benign stall characteristics that add significantly to the trouble free deployment of the delta flaps.

The sharp leading edges of the delta flap respond immediately with the generation of a vortex when the delta moves out of the zero incidence position. As the angle of attack of the delta increases the vortex starts far outboard close to the trailing edge of the delta flap and then moves toward the apex of the delta and inboard. The fast response of the flow to deployment and the reliable generation of the vortex system as long as the delta flap is exposed to an organized flow field make the delta flaps an excellent recovery device for emergency situations like inadvertent stall or spin. The key to the proper functioning is the forward position of the delta flap relative to the trailing edge of the aircraft wing where still healthy flow conditions prevail even if the wing is already stalled. Since flow separation on the aircraft wing starts at the trailing edge and moves forward with increasing angle of attack of the aircraft, the delta flap position must be more toward the leading edge of the aircraft wing with increasing angle of attack. Such a movement is therefore an inherent feature of the deployment mechanism, as seen in FIG. 5, FIG. 6 and FIG. 7. Flow separation can be reversed if the kinetic energy collected by the delta flap is of the order of magnitude of the kinetic energy contained in the flow separation area of the aircraft wing.

Clearly, a larger delta planform is generally more effective than a smaller one. The size and position of the delta flap must have a specific relationship to the geometry of the aircraft wing. Optimization of the high lift effect requires a compromise between desirable size and weight. Optimization parameters are:

(a) the aspect ratio of the delta flap in relation to the aircraft wing cord size and profile thickness (b) the ratio of the maximum chord of the delta to the aircraft wing chord (c) the position of the delta flap in its fully retracted state (d) the position of the delta flap in its fully deployed state (e) the functional dependency between the aircraft angle of attack, the delta flap position relative to the trailing edge of the aircraft wing and its angle of incidence relative to the aircraft wing chord and profile thickness (profile shape).

(f) the ratio of the distance of the trailing edge of the delta above the aircraft wing surface to the aircraft wing chord size and profile thickness.

Figure 10A:
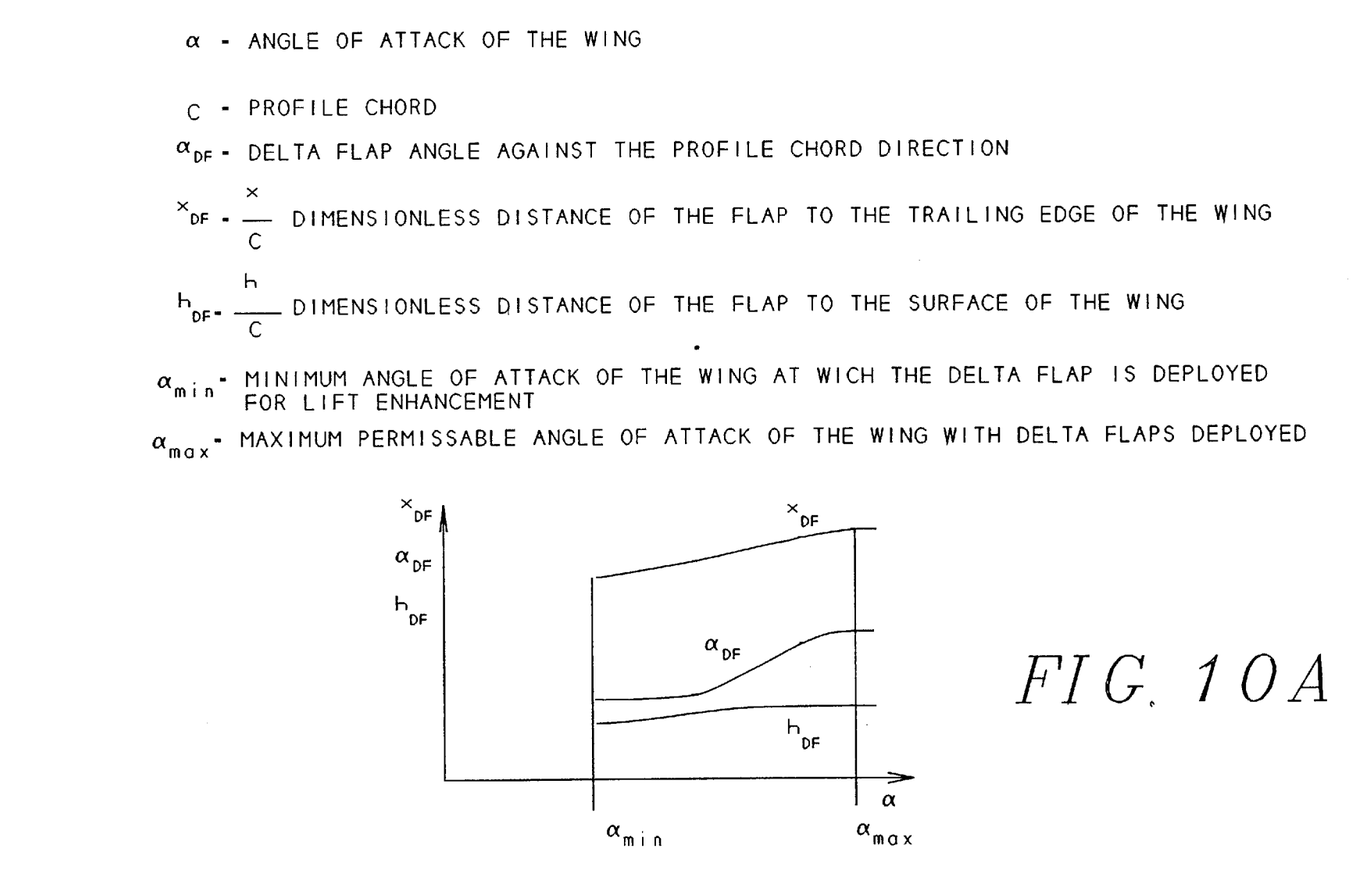
FIG. 10A illustrates graphically the relationship between the angle of attack of the wing on which a delta flap is deployed relative to the angle of the delta flap, the distance from the flap to the surface of the wing and the distance from the flap to the trailing edge of the wing.

These parameters must be determined for each aircraft wing design in order to optimize the delta flaps. For example, as illustrated in FIG. 10A the angular position of the delta flap $\alpha_{DF}$, the distance from the flap to the trailing edge of the wing $X_{DF}$, and the distance from the flap to the surface of the wing $h_{DF}$ is illustrated in relation to the angle of attack of a wing $\alpha$. The minimum angle of attack of the wing on which the delta flap is employed for lift enhancement is illustrated by $\alpha$min. and additionally the maximum permissible angle of attack of the wing is shown by $\alpha$max.

Figure 10B:
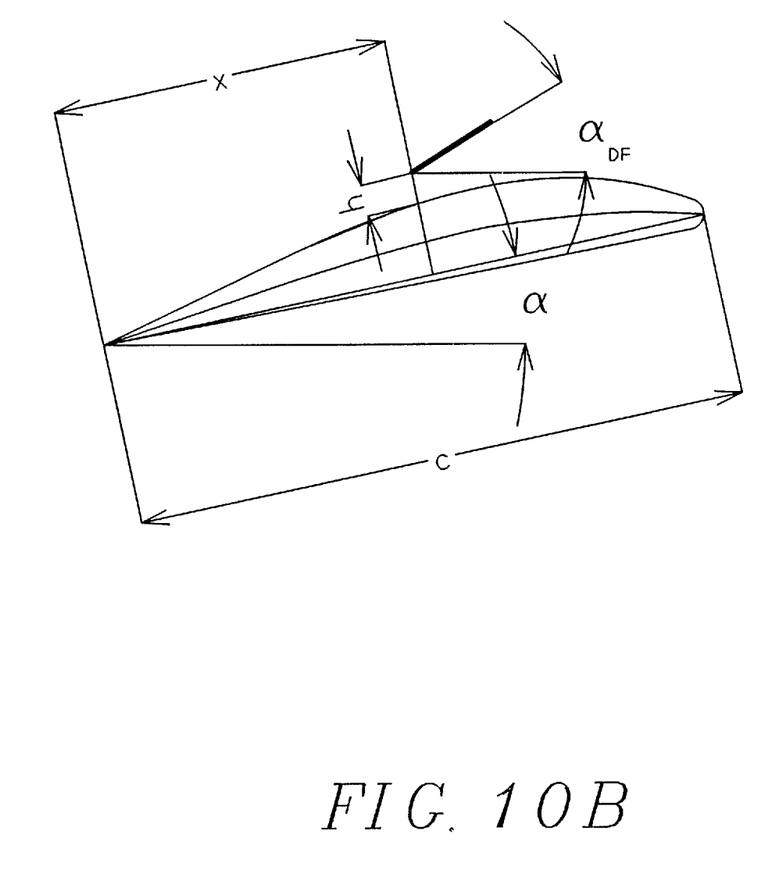
Fig. 10B illustrates the definitional values in FIG. 10A.

The specific locations of the angles and distances is illustrated in FIG. 10B. It should be noted clearly that the position of the delta wing flaps above the aircraft wing is dependent upon the angle of attack of the aircraft wing and the aerodynamic condition of the wing, i.e., stall, spin, take-off and landing.

Figure 11:
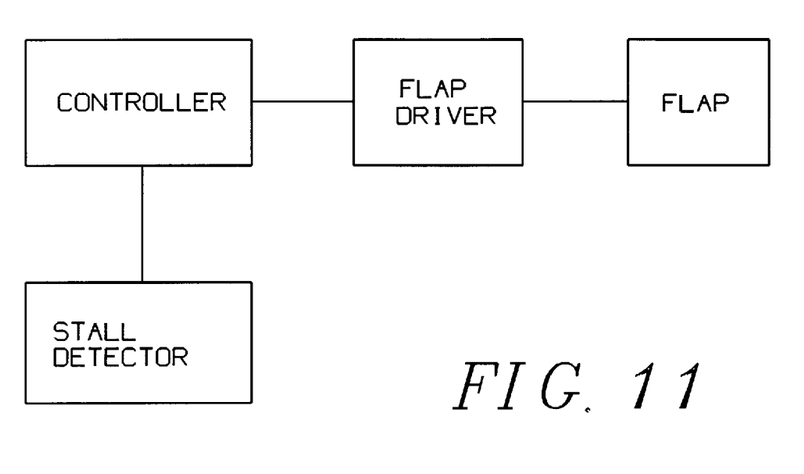
FIG. 11 is a block diagram of a simple stall activated control for the flap.

The flap 12 may be deployed and driven automatically to positions which counter and overcome the stall. For example, as illustrated in FIG. 11 a conventional stall detector may provide signals to a controller programmed to actuate the flap driving motors to position the flap to an active position to provide sufficient redirection of the flow field into the flow separation region to overcome the stall.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A flight lifting surface assembly for aircraft comprising in combination, a wing including upper and lower surfaces extending lengthwise intermediate a leading edge and a trailing edge and at least one flap, said flap having a delta shaped configuration including an apex extending into the flow, a pair of leading edges extending from the apex and terminating at a trailing edge, said flap having upper and lower surfaces converging at a small angle to define sharp leading edges, flap driving means for moving said flap from an inoperative position with the upper surface of said flap substantially forming a continuation of the upper surface of said wing to an operative position disposed above the upper surface of the wing and spaced from the leading edge of said wing by a distance approximately equal to ¼ of the distance from the leading edge of the wing to the trailing edge of the wing, said flap in the operative position being disposed with said apex and said trailing edge of said flap above the upper surface of said wing with said apex being spaced further above the wing than the trailing edge of said flap is spaced above said wing, and the trailing edge of said flap being disposed substantially parallel to the upper surface of said wing when in said operative position.

2. A flight lifting surface assembly as recited in claim 1, wherein the leading edges of said flap are substantially longer than the trailing edge of said flap such that the delta shape is slender.

3. A flight lifting surface assembly as recited in claim 1, wherein said driving means moves said flap to position the leading edges and the angle of attack of said flap relative to said wing.

4. A flight lifting surface assembly as recited in claim 3, wherein said driving means positions the leading edges and angle of attack of said flap substantially simultaneously.

5. A flight lifting surface assembly as recited in claim 3, wherein said driving means positions the leading edges and angle of attack of said flap independently.

6. A flight lifting surface assembly as recited in claim 1, wherein said wing includes a plurality of said flaps, and said flap driving means includes means for deploying each of said flaps independently of the others.

7. A flight lifting surface assembly as recited in claim 1, wherein the aspect ratio of the flap is approximately 2.

8. A flight lifting surface assembly as recited in claim 1, wherein the position of said flap and the angle of attack of said flap is a function of the angle of attack of said wing.

9. A flight lifting surface assembly as recited in claim 1, wherein said flap driving means is activated upon the occurrence of a stall condition automatically.

10. A flight lifting surface assembly as recited in claim 1, wherein said wing includes a plurality of said flaps, and said flap driving means includes means for deploying all of said flaps together.

* * * * *